UNITED STATES PATENT OFFICE.

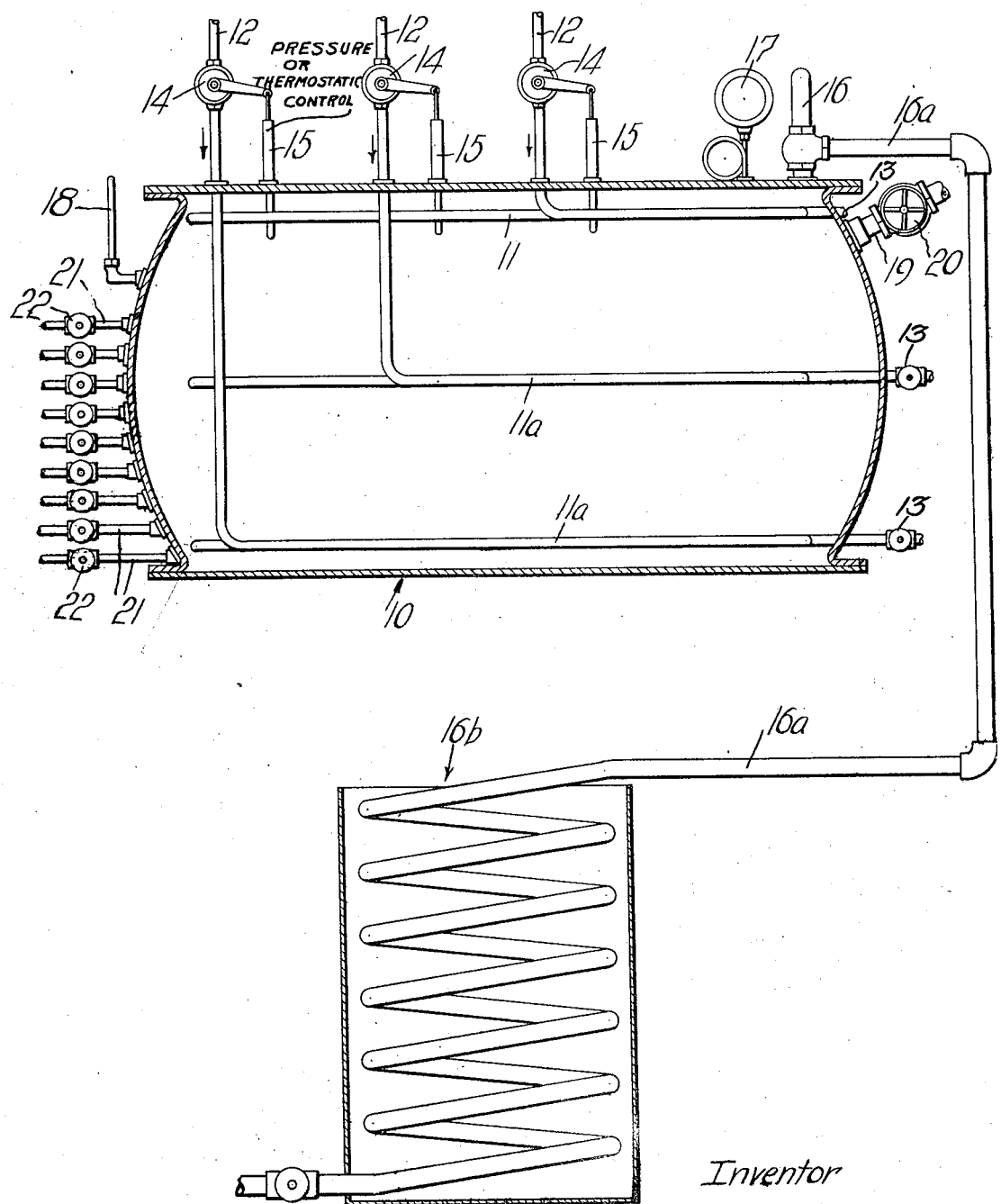

WALTER ARTHUR BROWN, OF LOS ANGELES, CALIFORNIA, ASSIGNOR OF ONE-HALF TO FLOYD G. WHITE, OF LOS ANGELES, CALIFORNIA.

PROCESS FOR SEPARATING HYDROCARBONS FROM WATER.

1,309,794.      Specification of Letters Patent.      Patented July 15, 1919.

Continuation of application Serial No. 68,832, filed December 27, 1915. This application filed July 12, 1916. Serial No. 108,853.

*To all whom it may concern:*

Be it known that I, WALTER ARTHUR BROWN, a citizen of the United States, residing at Los Angeles, in the county of Los Angeles, State of California, have invented new and useful Improvements in Processes for Separating Hydrocarbons from Water, of which the following is a specification.

This invention relates to processes for separating hydrocarbons and water; particularly to separating water out from that kind of mixture of oil and water known as emulsion. This invention is in the nature of an improvement upon my invention for which I have made application, Serial No. 68,832, on December 27, 1915; and this application is, in part, a continuation of said application. In this present application I set forth my general invention relating to separating hydrocarbons and water, and also set forth certain specific and preferred procedure.

The primary object of my invention is to provide a process which will thoroughly separate the water out of an emulson in an efficient and inexpensive manner. My process involves generally the treatment of the emulsion and then the settling out of the water therefrom; and the invention herein is embodied in my method of treating the emulsion and of settling out the water.

In an emulsion the water is present in extremely finely divided particles and is distributed throughout the oil and held in the oil by an action which is perhaps but imperfectly understood. However, I am not here concerned with the conditions of formation of an emulsion. My process includes steps in which these fine particles of water are brought together and then the large bodies of water are settled out of the oil.

The various details of my process will be best understood by reference to the following specification wherein I refer to the accompanying drawings, in which the figure is a section showing a form of apparatus in which my process may be carried out.

I show a heating tank 10, preferably in the form of a horizontal cylindrical shell, closed at both ends. Steam heating coils 11 and 11$^a$ are placed within the tank and steam enters at 12 and is discharged at 13. Entry of steam is controlled at 14 by a valve actuated and controlled by any suitable pressure or thermostatic controlling device as indicated at 15, the action of this device depending either upon the temperature or pressure within the tank and regulating the passage of steam so as to maintain an even temperature or pressure, or both. At 16 I provide a relief valve discharging to a pipe 16$^a$ leading to a condenser 16$^b$; this relief valve being for the purpose of relieving excessive pressure, as is hereinafter stated. Pressure gage is provided at 17 and a thermometer at 18. The emulsion is introduced through a pipe 19, controlled by valve 20. At one end of the tank I provide a series of vertically spaced outlet pipes 21 controlled by valves 22, for the purpose of withdrawing the separated oil and water.

I shall now explain my process as it may be carried out in such an apparatus, or in any similar apparatus. The emulsion is introduced to the tank and steam introduced to heat the liquids to a suitable temperature. This temperature is usually higher than the normal boiling point of water, and is preferably between 215° and 240° F., depending upon the character or quality of the emulsion being treated. I find that some emulsions require treatment at higher temperatures than others. At such temperatures there is a comparatively large vaporization of the lighter constituents of the oil, together with a certain amount of vaporization of water; and the pressure which would be generated in the tank, if not relieved, would be a pressure much higher than the pressure of water vapor at the stated temperature. I do not keep the pressure generated by that temperature, but allow the escape of a certain amount of generated gases and water vapor, so as to keep the pressure down to a point just above the water vapor pressure at that temperature; that is, I keep the pressure at such a point that it will just suffice to prevent the heated mass from foaming over. The relieved vapors are saved and condensed in condenser 16$^b$.

I continue this treatment of the emulsion for the length of time depending upon the character of the emulsion and depending upon how difficult the emulsion is to break down. This time is usually from 45 to 60 minutes after the emulsion begins to break down, which it does when it first reaches a temperature of about 200° F. By breaking down I mean that the fine particles of water begin to coalesce to form larger particles of water; and the treating step is continued until all of the fine original particles have sufficiently joined together to form larger particles so that these larger particles may then be settled out of the mixture by gravity.

Now, after this treating step, the water may be settled out of the mixture by gravitation action alone; but I prefer to accelerate the separating action. This I do in different manners, but particularly by the use of a mechanical precipitant and by the use of increased pressure upon the liquids while they are held at or about their previous temperature and while they are held quiescent. I have found that the introduction of a mechanical precipitant in the form of a finely divided substance, which is heavy enough to sink in the liquids, materially hastens the precipitation of the water. This mechanical precipitant I prefer to supply in the form of very finely divided solid matter, and I have found finely divided earth in the form of mud to be very effective. I prefer to introduce a precipitant with the emulsion when originally placed in the tank, but it may be added later, in the proportion necessary; perhaps 100 gallons or less of creamy mud to a charge of 500 bbls. The operation of introducing the emulsion to the tank serves to mix the precipitant with the emulsion; and the agitation of the liquids by heating serve to keep it thoroughly mixed with the emulsion during the treating step. When the liquids are held quiescent during the settling step, the finely divided precipitant then settles out through the oil; and the settling out of the precipitant accelerates the settling of the water. The action of the precipitant materially shortens the time required for settling out the water; and where the water settles out somewhat during the treating step, it materially shortens the time for treating.

Whether or not the mechanical precipitant is used, after the treating step is finished, I then subject the liquids to an increase of pressure without a corresponding increase of temperature. This increase of pressure may be brought about in any suitable manner; but I prefer to bring it about by heating the upper parts of the liquid in the tank without heating the lower parts of liquid. I desire during the settling out step, to keep the liquids at about their former temperature. Usually, during the settling out step, the temperature falls somewhat, but I do not desire the temperature to fall much below 212°. The pressure added usually brings the total pressure up to about 15 pounds per square inch; and this pressure is held while the water settles out. The length of time necessary for settling out the water depends upon the character of the original emulsion and depends also upon the thoroughness of the original treatment; varying from 15 minutes to two hours.

At the end of the settling step, the clear water may be withdrawn from the bottom of the tank and the clear oil then withdrawn, or the oil may be drawn from off the water.

It is a distinctive feature of my process that the original treatment of the liquids takes place at a temperature approximately at or above the normal boiling point of water, but under a pressure less than that which would be generated if all the vapors were held, and at a pressure substantially just above the pressure of water vapor at the temperature of operation. As hereinbefore stated, the water may be settled out of the mixture after treatment in this manner; but I prefer to accelerate the settling of the water. And the distinctive features of accelerating the settling of the water are the use of a higher pressure without a correspondingly higher temperature and also the use of the mechanical precipitant.

Having described a preferred form of my invention, I claim:

1. The herein described process of separating hydrocarbons and water from a mixture thereof, embodying heating the liquids and simultaneously holding them under a pressure just sufficient to prevent the liquids from foaming over by reason of the water boiling but not sufficient to prevent vaporization of the lighter hydrocarbons which vaporize more readily than water, and holding the liquids subject to such temperature and pressure for a length of time sufficient to cause the mixture to break down; and then separating the water out of the mixture.

2. The herein described process of separating hydrocarbons and water from a mixture thereof, embodying heating the liquids to a point approximately that of the normal boiling point of water and simultaneously holding them under a pressure just sufficient to prevent the liquids from foaming over by reason of the water boiling but not sufficient to prevent vaporization of the lighter hydrocarbons which vaporize more readily than water, and holding the liquids subject to such temperature and pressure for a length of time sufficient to cause the mixture to break down; and then separating the water out of the mixture.

3. The herein described process of separating hydrocarbons and water from a mixture thereof embodying first heating the liquids and simultaneously withdrawing the vapors from the heated liquids and holding the heated liquids under a pressure just sufficient to prevent the liquids from foaming over by reason of the water boiling but not sufficient to prevent vaporization of the lighter hydrocarbons which vaporize more readily than water, and holding the liquids subject to such temperature and pressure for a length of time sufficient to cause the mixture to break down; and then separating the water out of the mixture.

4. The herein described process of separating hydrocarbons and water from a mixture thereof embodying first heating the liquids to a point approximately that of the normal boiling point of water, simultaneously withdrawing the vapors from the heated liquids and holding them under a pressure just sufficient to prevent the liquid from foaming over by reason of vaporization of the water but not sufficient to prevent vaporization of the lighter hydrocarbons which vaporize more readily than water; and then holding the mixture quiescent and separating the water out by gravity.

5. The herein described process of separating hydrocarbons and water from a mixture thereof embodying first heating the liquids to a point approximately that of the normal boiling point of water, simultaneously withdrawing the vapors from the heated liquids and holding them under a pressure just sufficient to prevent the liquid from foaming over by reason of vaporization of the water; then holding the liquids quiescent and increasing the pressure thereon without increasing the temperature thereof and settling out the water by gravity.

6. The herein described process of separating hydrocarbons and water from a mixture thereof embodying first heating the liquids to a point approximately that of the normal boiling point of water simultaneously withdrawing the vapors from the heated liquids and holding them under a pressure just sufficient to prevent the liquid from foaming over by reason of vaporization of the water; then heating the upper parts of the liquid only to develop additional pressure upon the liquids without increasing the temperature of the body of the liquids, and allowing the water to settle out by gravitation.

7. The herein described process of separating hydrocarbons and water from the mixture thereof, embodying heating the mixed liquids to a temperature approximately that of the normal boiling point of water, introducing to the mixed liquids a solid non-soluble precipitant, and simultaneously with the heating holding the liquids under a pressure just sufficient to prevent the liquids from foaming over by reason of vaporization of the water and then holding the liquids quiescent and allowing the water to separate by gravity.

8. The herein described process of separating hydrocarbons and water from a mixture thereof, embodying first heating the mixed liquids to a temperature approximately of the normal boiling point of water, introducing a mechanical precipitant into the mixed liquids, and, simultaneously with the heating, holding the liquids under a pressure just sufficient to prevent the liquids foaming over by reason of vaporization of the water; then subjecting the mixed liquids to an increase in pressure without an increase in temperature and holding them quiescent to allow gravitational separation of the water.

9. The herein described process of separating hydrocarbons and water from a mixture thereof, embodying the subjection of an admixture of said mixture with a finely divided mechanical precipitant to heat and to a pressure just sufficient to prevent vaporization of the water; and then subjecting the admixture to an increase in pressure without an increase in temperature.

10. The herein described process of separating hydrocarbons and water from a mixture thereof, embodying the subjection of an admixture of said mixture with a finely divided mechanical precipitant to a temperature approximately that of the normal boiling point of water and to a pressure just sufficient to prevent vaporization of the water; and then subjecting the admixture to an increase in pressure without an increase in temperature.

11. The herein described process of separating hydrocarbons and water from a mixture thereof embodying first the injection into said mixture of a mechanical precipitant in the form of finely divided solid matter heavier than the mixture in suspension in water; then subjecting the admixture to a temperature approximately that of the normal boiling point of water and simultaneously taking off the vapors generated from the oil so as to keep the pressure constantly reduced to a pressure just sufficient to prevent the foaming over of the mixture by reason of vaporization of the water; and then subjecting the admixture to an increase in pressure without a corresponding increase in temperature and holding the same quiescent to allow the mechanical precipitant and the water to settle out by gravity.

12. The herein described process of separating hydro-carbons and water from a mixture thereof, embodying heating the mixture and simultaneously holding thereon a pressure substantially just sufficient to prevent foaming over by reason of vaporization of the water, then increasing the pressure without increasing the temperature, and allowing the water to settle out while the increased pressure is held.

13. The herein described process of separating hydro-carbons and water from a mixture thereof, embodying heating the mixture and simultaneously holding thereon a pressure substantially just slightly greater than the pressure of water vapor at the temperature used, and then changing the relation of temperature and pressure and thus making the pressure greater relatively to the water vapor pressure at such temperature and allowing the water to settle
5 out during the period of such changed relationship of temperature and pressure.

In witness that I claim the foregoing I have hereunto subscribed my name this 3d day of July 1916.

WALTER ARTHUR BROWN.

Witnesses:
 JAMES T. BARKELEW,
 EDWARD H. BARKELEW.